US007190355B2

(12) United States Patent
Motoyama et al.

(10) Patent No.: US 7,190,355 B2

(45) Date of Patent: Mar. 13, 2007

(54) INPUT DEVICE AND ELECTRONIC APPARATUS HAVING THE SAME

(75) Inventors: Shigeki Motoyama, Tokyo (JP); Hirokazu Nakayoshi, Kanagawa (JP); Shun Kayama, Saitama (JP); Yasuhiro Kataoka, Kanagawa (JP); Toshitaka Kawashima, Kanagawa (JP); Junichi Ohsako, Tokyo (JP)

(73) Assignee: Sony Corporation (JP)

( * ) Notice: Subject to any disclaimer, the term of this patent is extended or adjusted under 35 U.S.C. 154(b) by 89 days.

(21) Appl. No.: 10/684,460

(22) Filed: Oct. 15, 2003

(65) Prior Publication Data

US 2004/0080490 A1 Apr. 29, 2004

Related U.S. Application Data

(63) Continuation of application No. 09/662,879, filed on Sep. 15, 2000, now Pat. No. 6,690,362.

(30) Foreign Application Priority Data

Sep. 27, 1999 (JP) ................................ P11-272810

(51) Int. Cl.
*G09G 5/00* (2006.01)
*H01H 1/10* (2006.01)
*G06K 11/06* (2006.01)

(52) U.S. Cl. .................... 345/173; 178/18.03; 200/512

(58) Field of Classification Search ................ 345/156, 345/174–178, 104–105, 173; 503/201; 200/512–517
See application file for complete search history.

(56) References Cited

U.S. PATENT DOCUMENTS

| | | | | |
|---|---|---|---|---|
| 3,696,675 | A | | 10/1972 | Gilmour |
| 4,501,503 | A | | 2/1985 | Buirley et al. |
| 4,501,938 | A | * | 2/1985 | Kawauchi .................. 200/5 A |
| 4,525,032 | A | | 6/1985 | Hilsum |
| 4,554,565 | A | | 11/1985 | Kito et al. |
| 4,642,250 | A | | 2/1987 | Spector |
| 4,691,712 | A | | 9/1987 | Brown, Jr. |
| 4,701,579 | A | * | 10/1987 | Kurachi et al. ............. 200/5 A |
| 5,072,077 | A | * | 12/1991 | Klein .................... 250/231.13 |
| 5,228,562 | A | * | 7/1993 | Burk .......................... 200/512 |
| 5,557,208 | A | | 9/1996 | Parker |
| 5,736,687 | A | | 4/1998 | Sellers |
| 5,776,074 | A | | 7/1998 | Marzorati |
| 5,835,079 | A | | 11/1998 | Shieh |
| 6,379,850 | B1 | | 4/2002 | Ueda et al. |

FOREIGN PATENT DOCUMENTS

WO WO94/14112 A 6/1994

* cited by examiner

*Primary Examiner*—Henry N. Tran
(74) *Attorney, Agent, or Firm*—Rader Fishman & Grauer PLLC; Ronald P. Kananen

(57) ABSTRACT

An input device and an electronic apparatus using such an input device capable of providing visual amusement at the time of operating thereof and allowing the down sizing and thinning are provided. The input device has a reversible chromatic layer exhibiting color change in response to temperature change, and a sheet-type input portion laminated on the reversible chromatic layer and activates ON operation upon being pressed.

15 Claims, 18 Drawing Sheets

SAMPLE CASE
OUTPUTTING A VOLTAGE CORRESPONDING TO AN INPUT KEY CODE DECIDED BY INTERNAL PROCESSING OF A MICROCOMPUTER ALSO ALLOWABLE (A)

| INPUT KEY CODE | OUTPUT VOLTAGE RATIO |
|---|---|
| VOL+ | 0.5 |
| VOL- | 0.57 |
| STOP | 0.59 |
| PLAY/FF | 0.73 |
| REW | 0.9 |

※ OUTPUT VOLTAGE
= OUTPUT VOLTAGE RATIO × Vcc

FIG. 17

INPUT KEY CODE DECISION TABLE

| | (A) KEY INITIALLY TURNED ON | (B) CURRENT ON KEY | (C) INPUT KEY CODE |
|---|---|---|---|
| (D) | key0 | key0 | VOL+ |
| | key1 | key1 | INVALID |
| | key2 | key2 | STOP |
| | key3 | key3 | INVALID |
| | key4 | key4 | VOL- |
| | | | |
| (E) | key0 | key1 | PLAY/FF |
| | key1 | key2 | PLAY/FF |
| | key2 | key3 | PLAY/FF |
| | key3 | key4 | PLAY/FF |
| | | | |
| (F) | key4 | key3 | REW |
| | key3 | key2 | REW |
| | key2 | key1 | REW |
| | key1 | key0 | REW |

FIG. 18

INPUT KEY CODE DECISION SEQUENCE

| | |
|---|---|
| (A) | KEY SCAN<br>READS P10 TO P14 TO WHICH THE KEY SWITCH IS CONNECTED, JUDGES WHICH KEY IS ON, AND SETS THE ON KEY AS AN INITIALLY ON KEY |
| | switch (KEY SCAN WILL BE RE-STARTED AFTER A PREDETERMINED PERIOD) |
| (B) | case SAME KEY TURNS ON: SET AN INPUT KEY CODE DEFINED FOR THAT KEY |
| (C) | case ADJACENT KEY TURNS ON: SET AN INPUT KEY CODE DECIDED BASED ON A COMBINATION OF AN INITIALLY ON KEY AND A CURRENT ON KEY |
| (D) | default OTHERS: SET A CURRENT ON KEY AS AN INITIALLY ON KEY WHILE NEGLECTING A KEY INITIALLY TURNED ON |

INPUT DEVICE AND ELECTRONIC APPARATUS HAVING THE SAME

This application is a continuation of application Ser. No. 09/662,879, filed on Sep. 15, 2000 now U.S. Pat. No. 6,690,362.

BACKGROUND OF THE INVENTION

1. Field of the Invention

The present invention relates to an input device and an electronic apparatus having such an input device capable of providing visual amusement at the time of operating thereof.

2. Description of Related Art

In input devices such as key switch, touch switch and touch panel operated by finger touch, feedback for the input operation largely depends on tactual sense of a finger. A key switch is an only input device ever known to be integrated with a visual feedback indicator, in which color change is effected by incorporating a self-light-emitting element so as to be active in response to the ON/OFF operation of such switch, or by providing a mechanical shutter so as to cover/uncover the color-coated inner surface.

The touch panel is often mounted as a single-function device to electronic apparatus and examples of which, as combined with visual feedback display devices, include computer display and liquid crystal display.

The conventional switch is, however, disadvantageous in that feedback depending on the tactual sense cannot readily be obtained with a thinned switch due to a limited displacement in response to the input operation.

A problem also resides in that incorporating the foregoing visual feedback display device into a small-sized apparatus will also require relevant electronic circuits, wirings and contact portions, which may be an obstacle to the thinning, weight reduction and power saving.

Another problem resides in that, for a case of using a display device, a CPU (central processing unit) affording a certain level of high-speed processing will be required for ensuring real-time feedback display, which is disadvantageous in terms of cost, power consumption and heat generation.

SUMMARY OF THE INVENTION

It is therefore an object of the present invention to solve the foregoing problem and to provide an input device allowing the down sizing and thinning, and providing visual amusement at the time of operating thereof, and to provide an electronic apparatus having such an input device.

According to the first aspect of the present invention, there is provided an input device which comprises:

a reversible chromatic layer exhibiting color change in response to temperature change; and a sheet-type input portion laminated on the reversible chromatic layer and activates ON operation upon being pressed.

Since the reversible chromatic layer causes color change simply by pressing the sheet-type input portion in the ON operation, visual change is enjoyable while achieving the down sizing and thinning.

In the second aspect of the present invention, the input device having the above first feature is characterized in that the reversible chromatic layer is located on a front surface of the sheet-type input portion and an input operation is effected by direct contact with such reversible chromatic layer.

When operating such an input device, the user directly touches the reversible chromatic layer.

In the third aspect of the present invention, the input device having the above first feature is characterized in that the reversible chromatic layer is located on a rear surface of the sheet-type input portion and an input operation is effected by direct contact with such sheet-type input portion.

When operating such an input device, the user directly touches the sheet-type input portion.

In the fourth aspect of the present invention, the input device having the above second feature is characterized in that heat required to cause temperature change of the reversible chromatic layer is provided through the direct contact thereto with a part of a human body.

That is, heat required to cause temperature change of the reversible chromatic layer is simply provided by a human touch.

In the fifth aspect of the present invention, the input device having the above third feature is characterized in that heat required to cause temperature change of the reversible chromatic layer is provided from an inner portion of an electronic apparatus.

That is, heat generated in the inner portion of the electronic apparatus can be consumed for causing temperature change in the reversible chromatic layer.

According to the sixth aspect of the present invention, there is provided an electronic apparatus having an input device, and the input device comprises:

a reversible chromatic layer exhibiting color change in response to temperature change; and a sheet-type input portion laminated on the reversible chromatic layer and activates ON operation upon being pressed.

In such constitution, the reversible chromatic layer causes color change in response to the temperature change thereof. The sheet-type input portion is provided as laminated on the reversible chromatic layer, and can activate the ON operation simply by being pressed.

This allows color change of the reversible chromatic layer simply by pressing the sheet-type input portion in the ON operation, and can provide the user with visual amusement at the time of the ON operation of such an input device.

In the seventh aspect of the present invention, the electronic apparatus having the above sixth feature is characterized in that the reversible chromatic layer is located on a front surface of the sheet-type input portion and exposed outward within a window provided to a housing of the electronic apparatus, and an input operation is effected by direct contact with such reversible chromatic layer.

When operating such an input device, the user directly touches the reversible chromatic layer.

In the eighth aspect of the present invention, the electronic apparatus having the above sixth feature is characterized in that the sheet-type input portion is exposed outward within a window provided to a housing of the electronic apparatus, the reversible chromatic layer is located on a rear surface of such sheet-type input portion, and an input operation is effected by direct contact with such sheet-type switch portion.

When operating such an input device, the user directly touches the sheet-type input portion.

In the ninth aspect of the present invention, the electronic apparatus having the above seventh feature is characterized in that heat required to cause temperature change of the reversible chromatic layer is provided through the direct contact thereto with a part of a human body.

That is, heat required to cause temperature change of the reversible chromatic layer is simply provided by a human touch.

In the tenth aspect of the present invention, the electronic apparatus having the above eighth feature is characterized in that heat required to cause temperature change of the reversible chromatic layer is provided from an inner portion of an electronic apparatus.

That is, heat generated in the inner portion of the electronic apparatus can be consumed for causing temperature change in the reversible chromatic layer.

BRIEF DESCRIPTION OF THE DRAWINGS

FIG. 17 is a drawing showing an exemplary input key code decision table; and FIG. 18 is a drawing showing an exemplary input key code decision sequence.

DESCRIPTION OF THE PREFERRED EMBODIMENTS

Preferred embodiments of the present invention will be explained in detail hereinafter referring to the attached drawings.

The embodiments described hereinafter are preferred specific examples of the present invention, so that they will appear with various technically preferable limitations. It is, however, to be understood that the scope of the present invention is not restricted at all to the embodiments unless otherwise being specifically noted.

Figure 1:
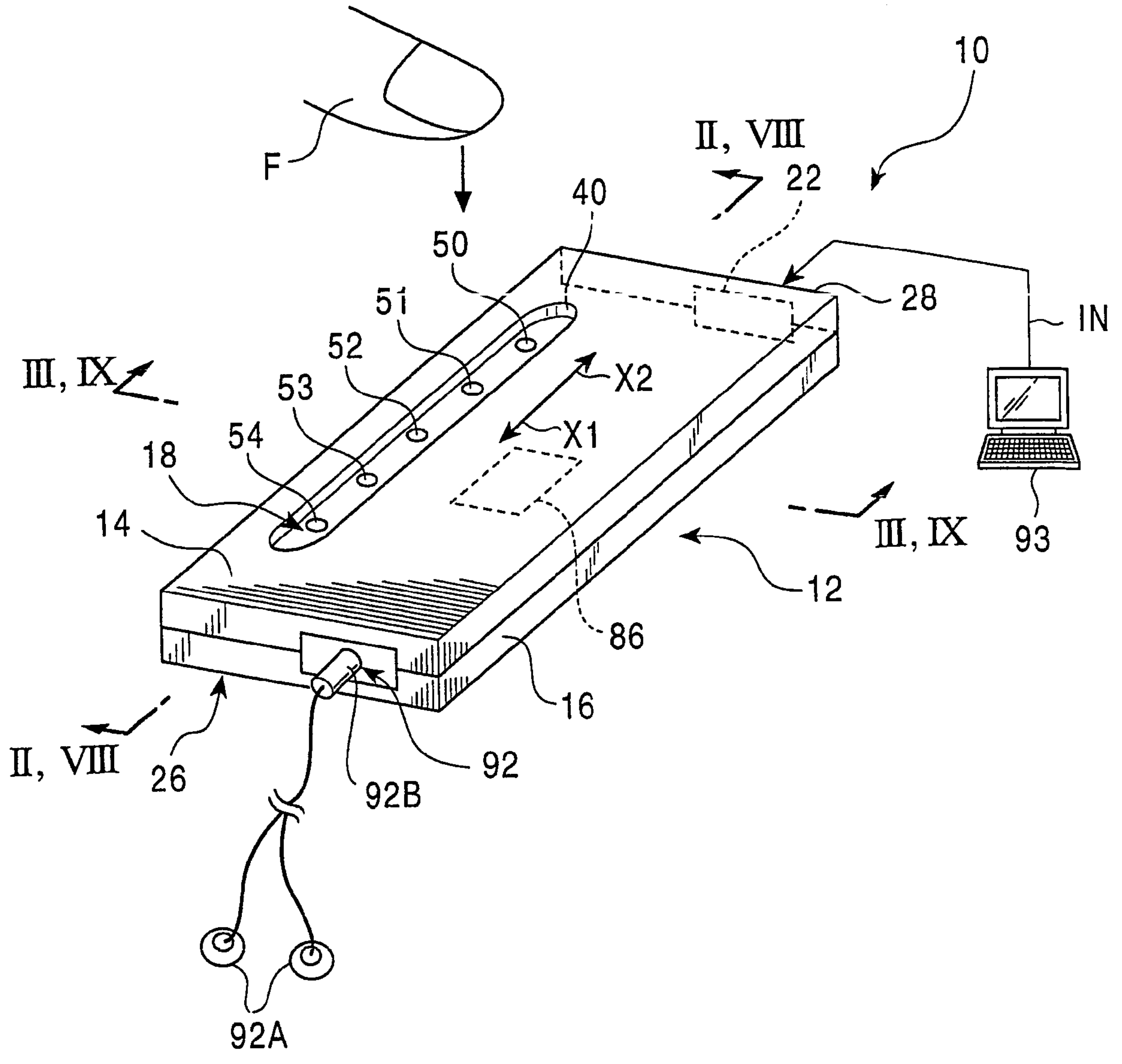
FIG. 1 is a perspective view showing a preferred embodiment of an input device and an electronic apparatus having such an input device according to the present invention.

FIG. 1 shows a preferable embodiment of an electronic apparatus equipped with an input device of the present invention.

An electronic apparatus 10 allows the user to enter a desired command by gently pressing a switch 18 with the finger F. The electronic apparatus 10 in this embodiment is typified as a portable music reproducing apparatus for replaying music information, and replays the music information when the user enters a predetermined command.

The electronic apparatus 10 has a housing (case) 12 and the switch 18.

The housing 12 comprises an upper housing portion 14 and a lower housing portion 16, and is made of, for example, a plastic or a metal. For a case where the housing 12 is made of a plastic, available plastics include ABS (acrylonitrile-butadiene-styrene), ABS-PC (acrylonitrile-butadiene-styrene-polycarbonate), PA (polyamide), PC (polycarbonate), LCP (liquid crystal polymer) and the like. For a case where the housing 12 is made of a metal, available metals include Mg alloy, Al alloy, Zn alloy and the like.

On an end plane 26 of the housing 12 shown in FIG. 1, an output portion 92 is provided. By connecting a plug 92B of a stereo earphone 92A to the output portion 92, the user can enjoy the music stored in a memory 86 through the stereo earphone 92A. On an opposite end plane 28 of the housing 12, an interface portion 22 is provided. By connecting, for example, an external computer 93 to the interface portion 22, the user can download the music information IN from the computer 93 into the internal memory 86 accommodated in the housing 12.

Figure 2:
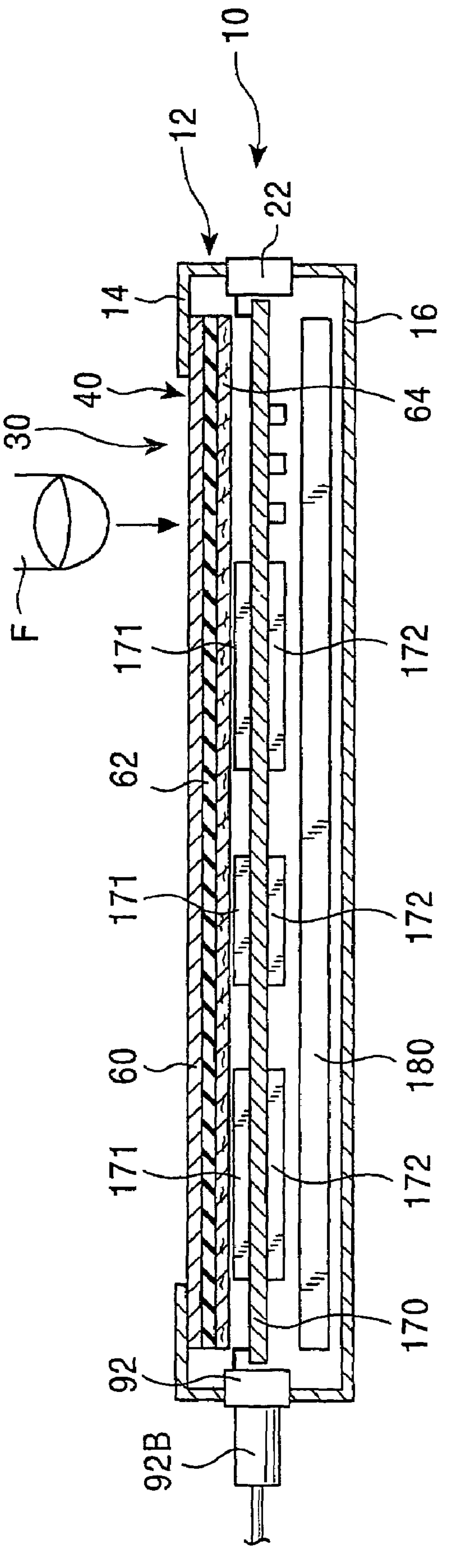
FIG. 2 is a sectional view of the electronic apparatus taken along the line II—II in FIG. 1.
Figure 3:
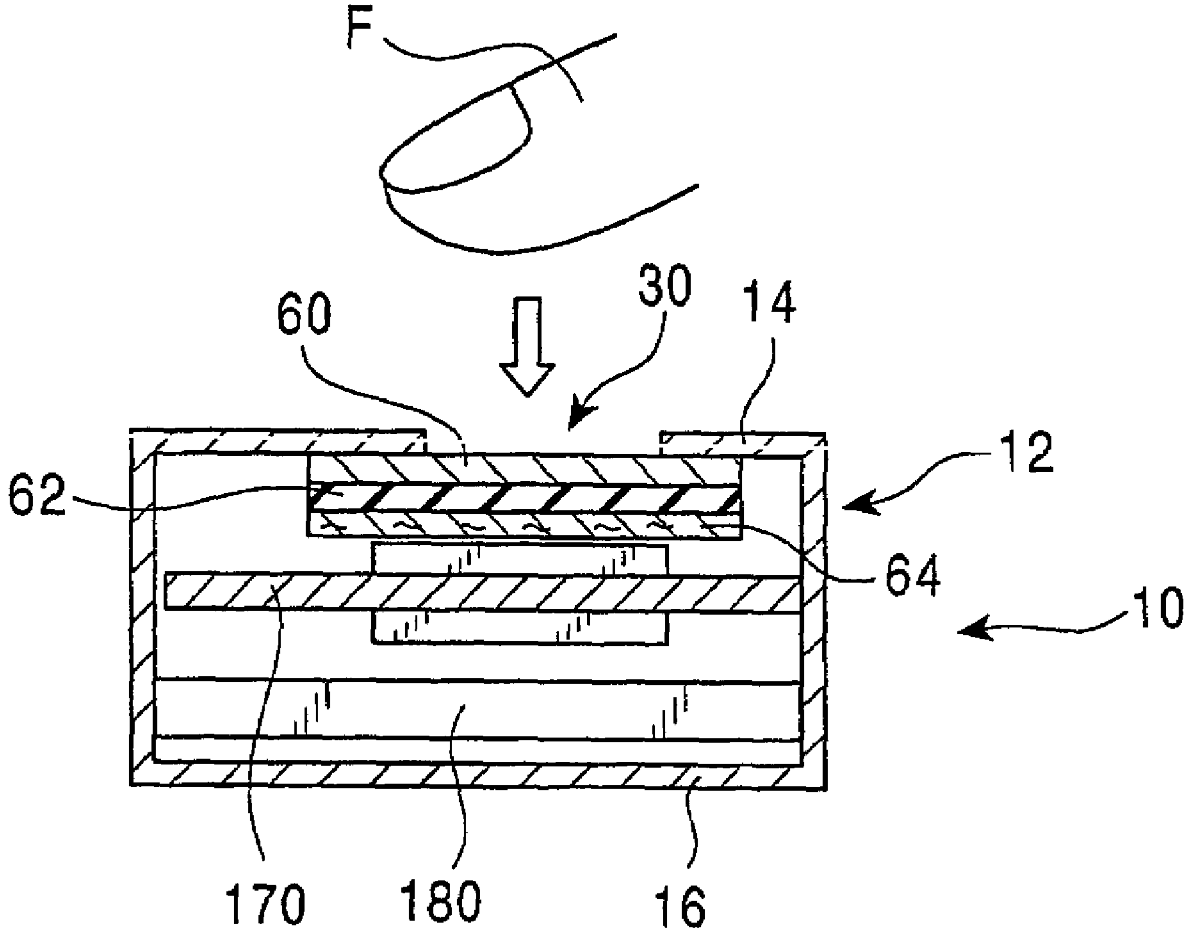
FIG. 3 is a sectional view of the electronic apparatus taken along the line III—III in FIG. 1.

FIG. 2 shows a sectional view of the electronic apparatus 10 taken along the line II—II in FIG. 1, and FIG. 3 shows a sectional view taken along the line III—III in FIG. 1.

As shown in FIGS. 2 and 3, a switch 30, a circuit board 170 and a battery 180 and the like are accommodated in a space surrounded by the upper housing portion 14 and the lower housing portion 16 of the housing 12.

The battery 180 is exemplified as a nickel-cadmium battery, nickel-hydrogen battery, lithium ion secondary battery or lithium-polymer battery, and is fixed on the bottom of the lower housing portion 16.

The circuit board 170 has a plurality of electronic parts 171, 172 mounted thereon. The electronic parts 171, 172 are, for example, a driver and a CPU, both of which are causative of heat generation during the operation. The circuit board 170 is electrically connected to the output portion 92 and interface portion 22 shown in FIG. 1.

The switch 30 is located so as to aligne with a slit portion 40 of the upper housing portion 14, and most part of the switch 30 is exposed outward within the slit portion 40. This allows the finger F to directly touch the most part of the switch 30. When directly touching the switch 30, the user can move the finger F along the direction X1 or X2 indicated in FIG. 1.

Figure 4:
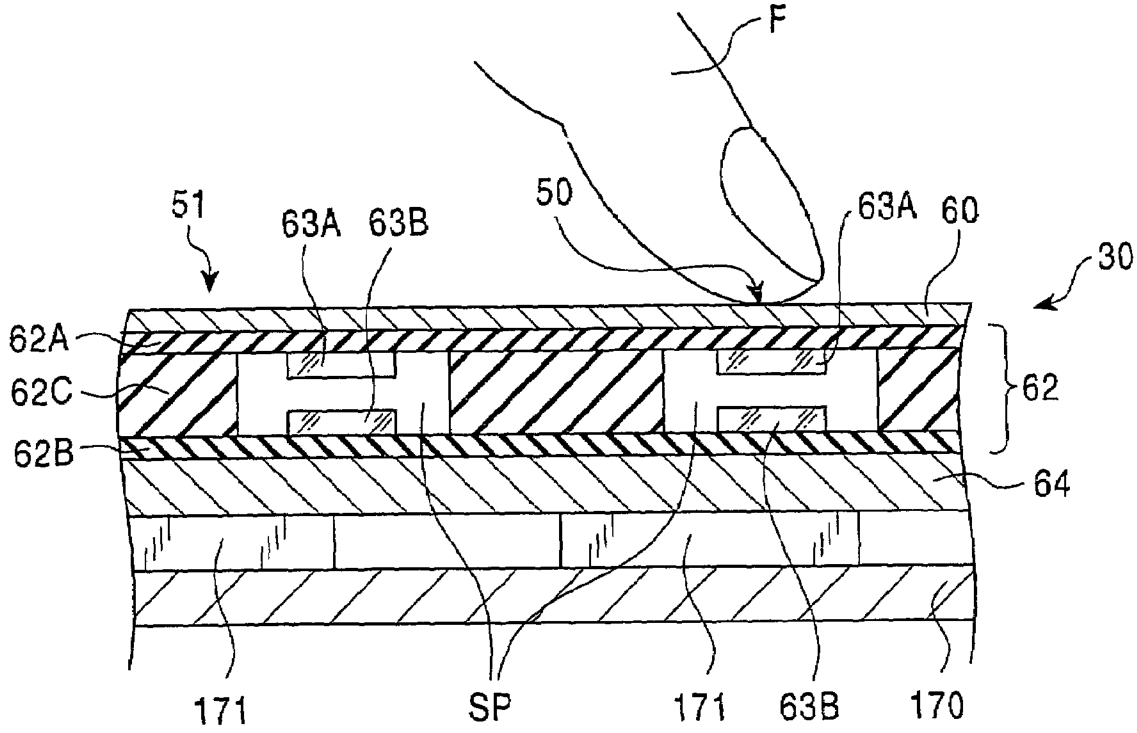
FIG. 4 is an enlarged view of the input device and so forth.
Figure 5:
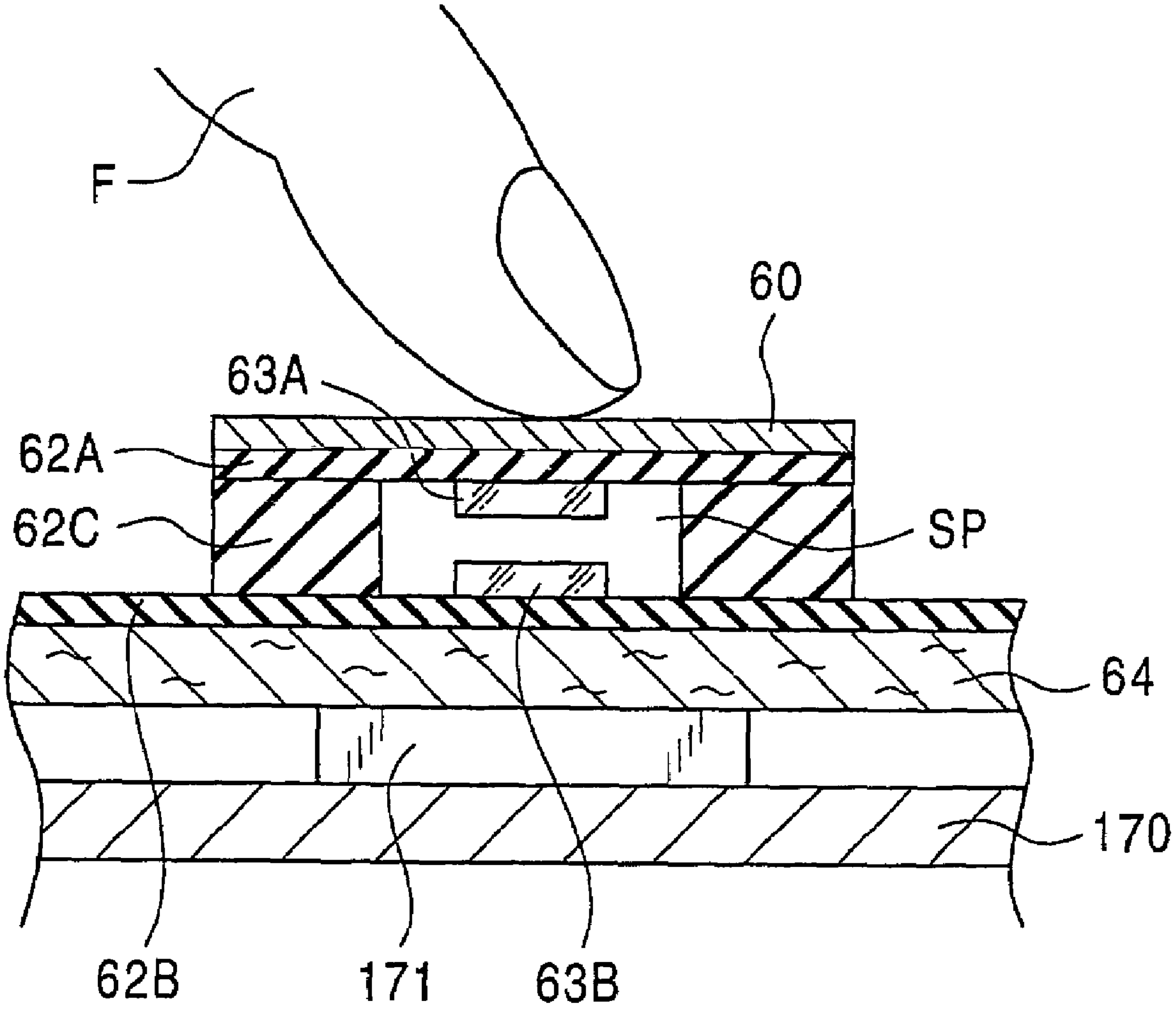
FIG. 5 is an enlarged view of the input device and so forth as viewed form another angle.

FIGS. 4 and 5 show enlarged views of the laminated structure shown in FIGS. 2 and 3.

The switch 30 comprises a reversible chromatic layer 60, a sheet-type switch portion 62 and a heat-insulating layer 64 laminated and adhered with each other. The heat-insulating layer 64 is responsible for preventing heat generated by the electronic parts 171, 172 on the circuit board 170 from conducting toward the reversible chromatic layer 60.

The reversible chromatic layer 60 is a layer comprising a substance, the spectrum of which changes at least in the visible light region in response to temperature change within a certain range, which is also known as a reversible thermochromic substance or the like.

The following materials are used for the reversible chromatic layer 60.

The reversible chromatic layer 60 comprises a substance exhibiting thermochromism and is available for heat sensitive display. Thermochromism refers to a phenomenon such that a color is not observed at a certain temperature but develops under proper heating, or such that a color is observed at the normal temperature but fades or changes into another color as the temperature rises.

As such a substance used for the reversible chromatic layer 60, conventionally used is such that liberates water under heating to cause color change and re-absorb the water under cooling to recover the initial color. Specific examples of such a substance include double salts comprising transition metals such as cobalt, nickel and manganese as combined with amine amides such as hexamethylene tetramine; mercury iodide; double complex salts comprising mercury iodide and other metal iodide; heavy metal compounds such as lead chromate and ammonium metavanadate; organic compounds such as dixanthilene and bianthrone; and certain kinds of organic dyes and pigments.

Other known thermochromic substances available for the reversible chromatic layer 60 include cholesteric liquid crystal, or mixture of cholesteric and nematic liquid crystals.

A heat sensitive chromatic agent is recently developed and widely used; the agent comprising an electron donor substance developing a color by releasing an electron and an electron acceptor substance (electron accepting developer) mixed therewith.

Known electron accepting developers include phenols, phenol resin oligomer, organic acids such as oxyaromatic carboxylic acids, acidic substances such as zinc chloride and stannous chloride, and adsorbents such as attapulgite and montmorillonite.

There are no specific limitations on the electron donating coloring substance and any known substance may arbitrary be selected, provided that it can allow reversible color change between a dark color and perfect colorless. Specific examples thereof include substituted phenylmethane and fluorane derivatives such as 3,3'-dimethoxyfluorane (yellow), 3,3'-dibutoxyfluorane (yellow), 3-chloro-6-phenylaminofluorane (yellowish orange), 3-diethylamino-6-methylchlorofluorane (reddish orange), 3-diethyl-7,8-benzofluorane (pink), 3,3',3"-tris(p-dimethylaminophenyl) phthalide (bluish purple), 3,3'-bis(p-dimethylaminophenyl) phthalide (green), 3-diethylamino-7-dibenzylaminofluorane (dark green), 3-diethylamino-6-methyl-7-phenylaminofluorane (black); various indolyl phthalide-base dye (blue to green); and spiropyranes (yellowish brown to reddish green). These compounds may be used independently or in combination of two or more thereof.

There are no specific limitations also on the electron accepting developer and any known substance may arbitrary be selected. Specific examples thereof include phenols, oxyaromatic carboxylic acid, carboxylic acid, azoles, azole esters, azole amides, and metal salts thereof such as lithium salt, sodium salt, calcium salt, magnesium salt, aluminum salt, zinc salt, tin salt, titanium salt and nickel salt. These compounds may be used independently or in combination of two or more thereof.

In the switch 30, which is also referred to as an input apparatus, a paint exhibiting reversible thermochromism is coated in an area coming into direct contact with the finger F. The thermochromic coloring agents include organic phosphor, metal complex solution and chiral nematic liquid crystal, all of which can vary the light emission spectrum in response to temperature. These coloring agents are mixed with an auxiliary of petroleum-base, ester-base, ketone-base or aromatic-base, and coated using a spray gun or brush.

The auxiliary is selected optimally depending on the material composing the switch contact portion to be coated therewith. Thickness of the coated paint is closely related to the temperature rise through heat conduction, so that a thickness allowing a sufficient chromatic effect is preferable. The temperature range allowing the color change is preferably selected so that a first color in the lower temperature region is developed at the temperature of the housing or other peripheral portions, and that a second color in the higher temperature region is developed at the temperature within an area around the site of the finger touch at the time of such finger touch. It is now necessary to properly select the coloring agent and the auxiliary depending on the environment in which they are used, since the above temperature may vary depending on such environment of use.

With such an input device involving the coated layer, an input operation is effected by a direct touch by the user's finger F, heat required for the temperature change of the reversible chromatic layer 60 will be provided through heat conduction toward the coated plane, and the temperature within an area around the site of the finger touch will rise to develop the color change in such area.

As shown in FIGS. 4 and 5, the reversible chromatic layer 60 is laminated on the front surface (top surface) of the switch 30 by printing or coating with a brush or spray gun, or integrated with an upper sheet 62A or a lower sheet 62B by kneading.

The sheet-type switch portion 62 has the upper sheet 62A susceptible of elastic deformation upon a gentle touch with the finger F, the lower sheet 62B and spacers 62C. The spacers 62C contribute to maintain a space SP between the upper sheet 62A and lower sheet 62B, and in the space SP electrodes 63A and 63B are housed. The upper sheet 62A, lower sheet 62B and spacers 62C are made of an insulating material such as biaxially stretched PET (polyethylene terephthalate) film, uniaxially stretched PET film, PC (polycarbonate) film or PES (polyether sulfone) film.

The switch 30 has switch contact points 50 to 54 regularlly spaced as shown in FIG. 1. FIG. 4 typically shows an exemplary constitution of the switch contact point 50 and the adjacent switch contact point 51. The structures of electrodes 63A and 63B are the same for all switch contact points 50 to 54.

The electrodes 63A and 63B are made of, for example, Ag—C, C or Cu.

Next, an exemplary operation of the switch (also referred as to the input device) and the electronic apparatus having such switch previously shown in FIGS. 1 to 5 will be described referring to FIGS. 6A, 6B, 7A and 7B.

Figure 6A:
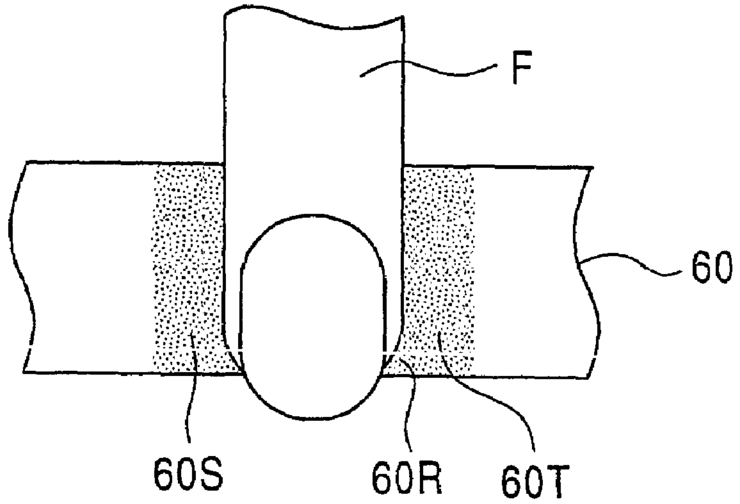
FIGS. 6A and 6B are views showing an exemplary color change caused by a finger placed on the reversible chromatic layer.
Figure 6B:
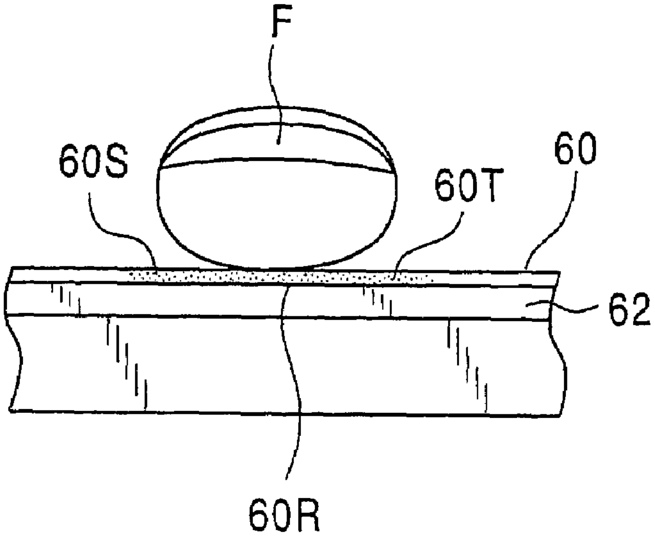

FIGS. 6A and 6B show an exemplary state in which the finger F is placed on the reversible chromatic layer 60. The reversible chromatic layer 60 exhibiting reversible thermochromism causes temperature rise upon placing of the finger F due to the body temperature conducted therefrom, which results in changes in the light emission spectrum of the reversible chromatic layer 60. FIGS. 6A and 6B shows the color change occurred at a finger-contacted portion 60R and adjacent portions 60S, 60T.

Figure 7A:
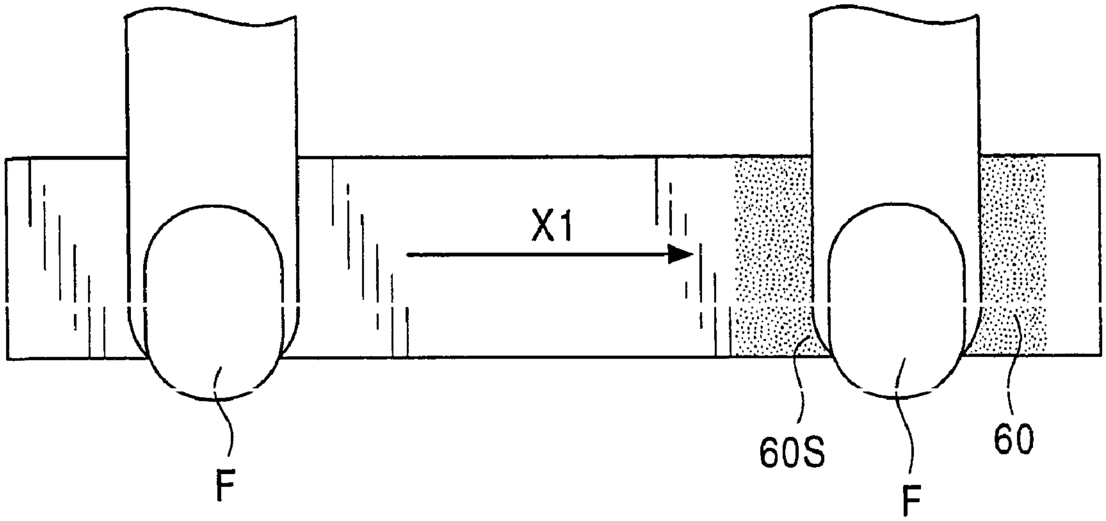
FIGS. 7A and 7B are views showing an exemplary color change caused by a finger sliding on the reversible chromatic layer.
Figure 7B:
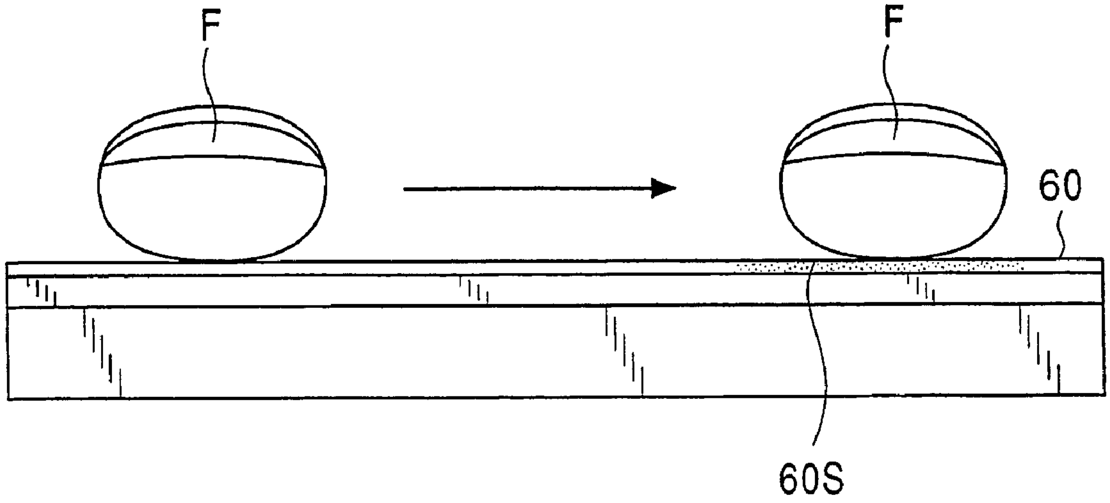

FIGS. 7A and 7B show an exemplary state in which the finger F is slid in the direction X1 along the reversible chromatic layer 60. As shown in the figures, the color change is observed in the adjacent portions 60S where the finger F just went by.

In such a manner, the user can activate ON operation of any one of, or an arbitrary combination of the switch contact points 50 to 54 by sliding the finger F on the reversible chromatic layer 60 of the switch 30 shown in FIGS. 1 and 2 in the directions X1 or X2 shown in FIG. 1, while enjoying the color change. Pressing an arbitrary one from the switch contact points 50 to 54 allows the electrodes 63A and 63B shown in FIG. 4 to come into an electric contact by force of the finger F. Thus the user can activate the ON operation of an arbitrary one of the switch contact points 50 to 54.

Another exemplary embodiment of the switch and the electronic apparatus having such switch of the present invention will be described referring to FIGS. 8 to 11.

Figure 8:
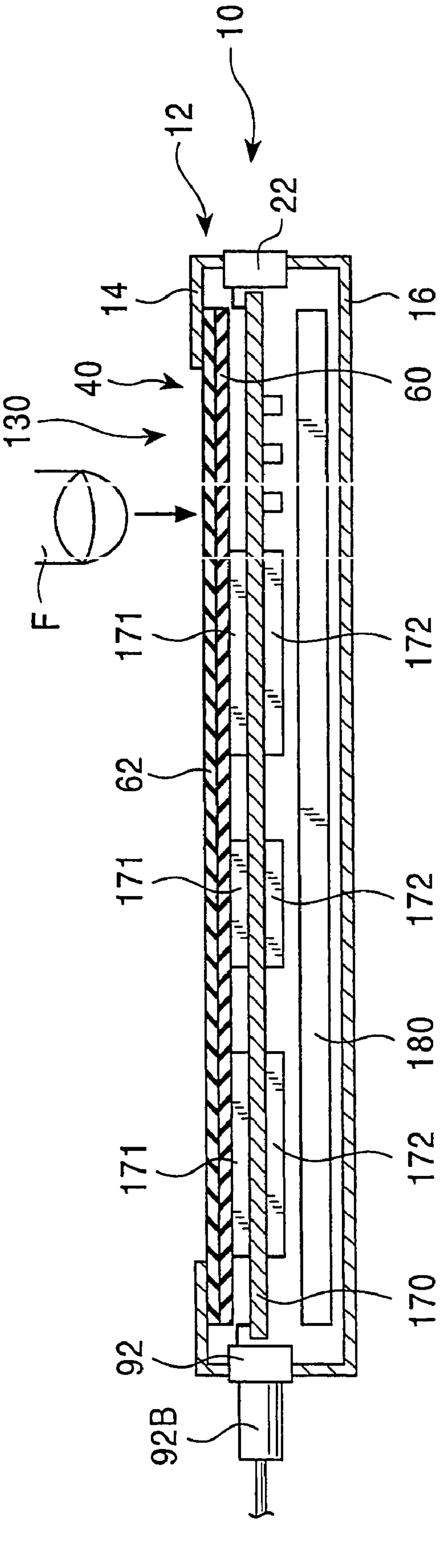
FIG. 8 is a sectional view showing another embodiment of the input device and the electronic apparatus having such an input device according to the present invention taken along the line VIII—VIII in FIG. 1.
Figure 9:
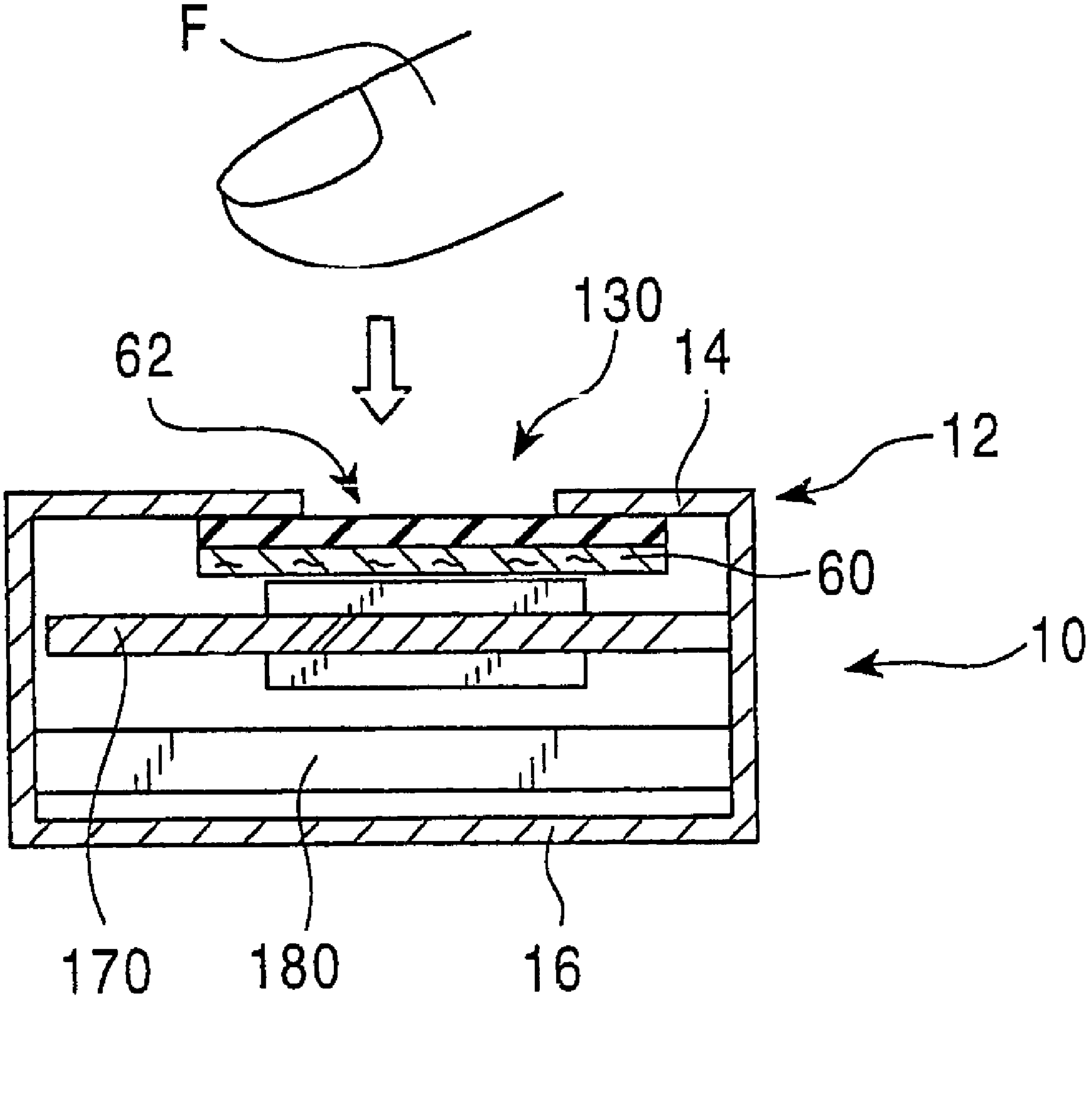
FIG. 9 is a sectional view showing another embodiment of the electronic apparatus taken along the line IX—IX in FIG. 1.

The switch and the electronic apparatus shown in FIGS. 8 and 9 differ from those shown in FIGS. 2 and 3 in the constitution of a switch 130.

Figure 10:
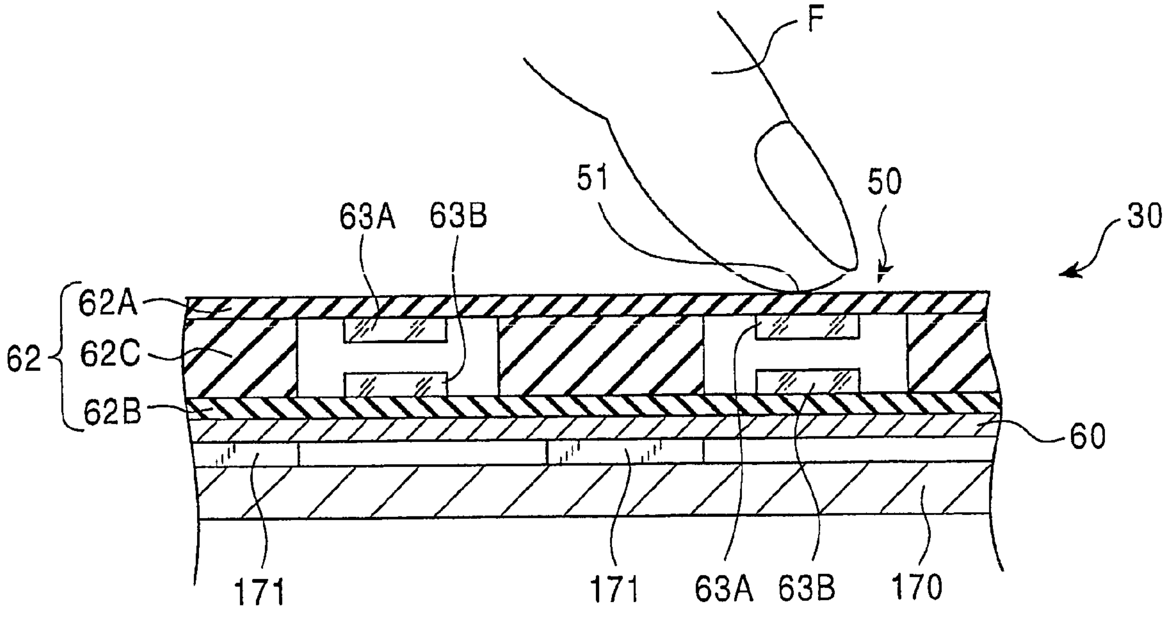
FIG. 10 is an enlarged view of the input device and so forth.
Figure 11:
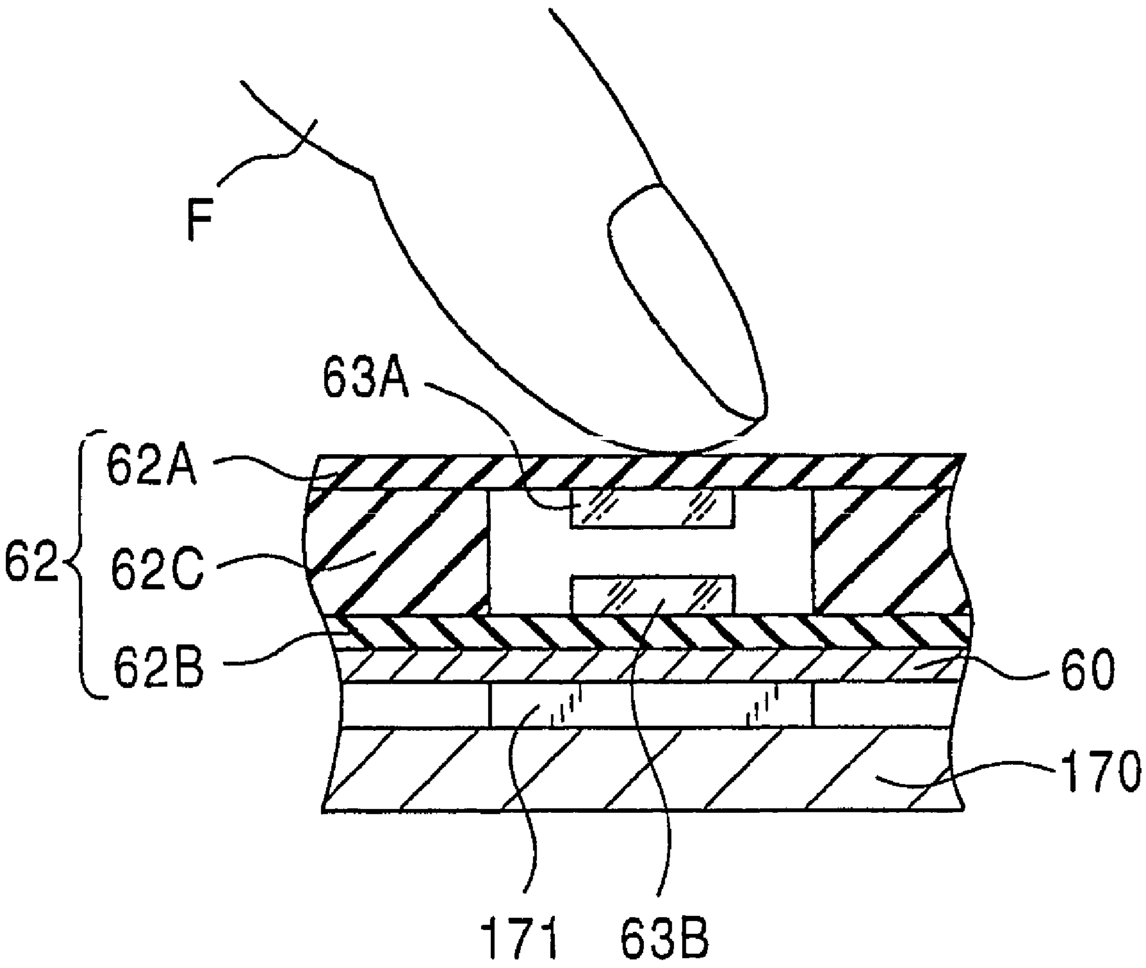
FIG. 11 is an enlarged view of the input device and so forth as viewed form another angle.

The switch 130 does not have the heat-insulating layer 64, unlike the embodiment shown in FIG. 4, and has only the sheet-type switch portion 62 and reversible chromatic layer 60 as shown in FIGS. 10 and 11.

The heat insulating layer 64 in the foregoing embodiment shown in FIG. 4 was composed so as to blocking the heat conducted from the electronic parts 171 on the circuit board 170, so that the reversible chromatic layer 60 can change color solely by the heat conducted from the finger F. That is, the heat required for the color change of the reversible chromatic layer 60 was directly obtained from the finger F as a part of the user's body.

On the contrary in the embodiment shown in FIGS. 8 and 10, the reversible chromatic layer 60 is placed as opposed to the electronic parts 171 mounted on the circuit board 170. That is, the reversible chromatic layer 60 is provided by coating or printing, or fixed by adhesion underneath, that is, on the rear plane of the lower sheet 62B of the sheet-type switch portion 62.

Since the reversible chromatic layer 60 is provided on the rear side of the sheet-type switch portion 62 comprising the upper sheet 62A, spacers 62C and lower sheet 62B as shown in FIG. 10, it is preferable for the user to enjoy the color change that the upper sheet 62A, spacers 62C and lower sheet 62B comprising the sheet-type switch portion 62, and preferably also the electrodes 63A, 63B, are transparent.

In this case, the upper sheet 62A, the lower sheet 62B and the spacers 62C are individually made of, for example, a transparent material, and specific examples of which include a uniaxially stretched PET film, PC film and PES film. Also the electrodes 63A and 63B are preferably made of a transparent material such as ITO (indium tin oxide; $In_2O_3$—$SnO_2$) obtained by sputtering, vapor deposition, ion plating or CVD (chemical vapor deposition); ATO (antimony tin oxide; $SnO_2$—$Sb_2O_5$); CTO (cadmium tin oxide; $Cd_2SnO_4$); $SnO_2$; ZnO—$SnO_2$; and CdO—ZnO—$SnO_2$.

The reversible chromatic layer 60 shown in FIG. 10 is designed to obtain heat necessary for the color change from the electronic parts 171 mounted on the circuit board 170. That is, heat generated by the electronic parts 171 on the circuit board 170 during the operation is directly used as a heat source for the temperature change of the reversible chromatic layer 60.

Since other parts of the switch and the electronic apparatus incorporating such switch shown in FIGS. 8 to 11 are the same as those shown in FIGS. 2 to 5, the same marks will be used in FIGS. 8 to 11 while omitting the description therefor.

In the embodiment shown in FIGS. 8 to 11, the user can activate ON operation of any one of, or an arbitrary combination of the switch contact points 50 to 54 by sliding the finger F, for example, in the directions X1 or X2 shown in FIG. 1. When a force is applied through the finger F to the switch contact points 50 to 54 of the sheet-type switch portion 62, a slight amount of heat from the finger F will conduct to the reversible chromatic layer 60 and cause the color change thereof so as to trace the movement of the finger F.

Figure 12A:
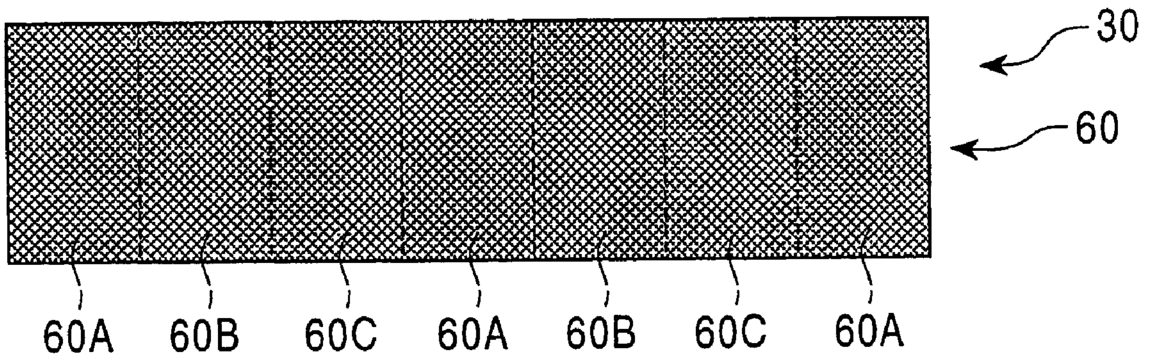
FIGS. 12A and 12B are views showing another embodiment of the present invention.
Figure 12B:
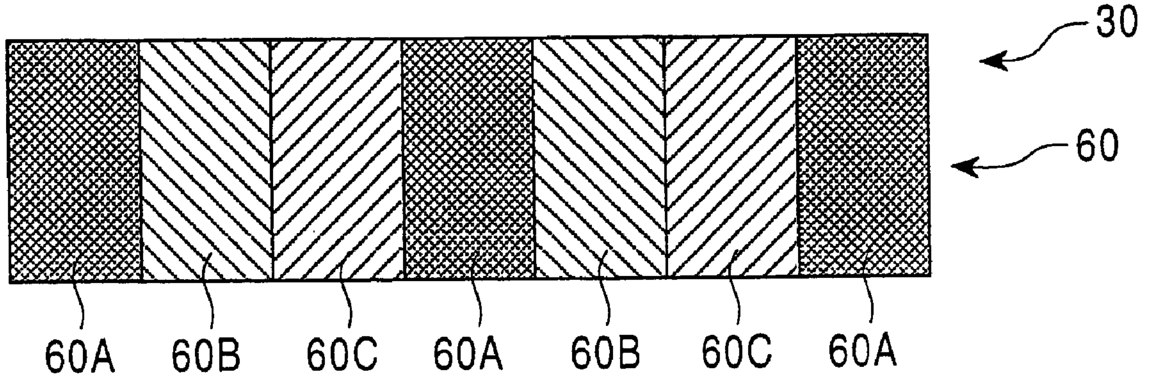

FIGS. 12A and 12B show another embodiment of the present invention.

The reversible chromatic layer 60 shown in FIGS. 12A and 12B is formed by coating two or more separate paint having different temperature-dependent chromatic characteristics. The reversible chromatic layer 60 shown in FIGS. 12A and 12B is obtained by, for example, coating in a repetitive manner reversible chromatic substance patterns 60A, 60B and 60C differing with each other in the temperature-dependent chromatic characteristics. This allows exhibition of different color change depending on the site of the finger touch on the reversible chromatic layer 60 of the switch 30.

When different kinds of reversible chromatic substances are coated, masking with a masking tape or so can allow a specific kind of the substance to be coated only to the limited area, and repeating such process by numbers of substances will provide such different color change as shown in FIGS. 12A and 12B.

FIG. 12A shows a state where different kinds of reversible chromatic substances are coated, and FIG. 12B shows an example of different color change after actual finger touch.

Figure 13A:
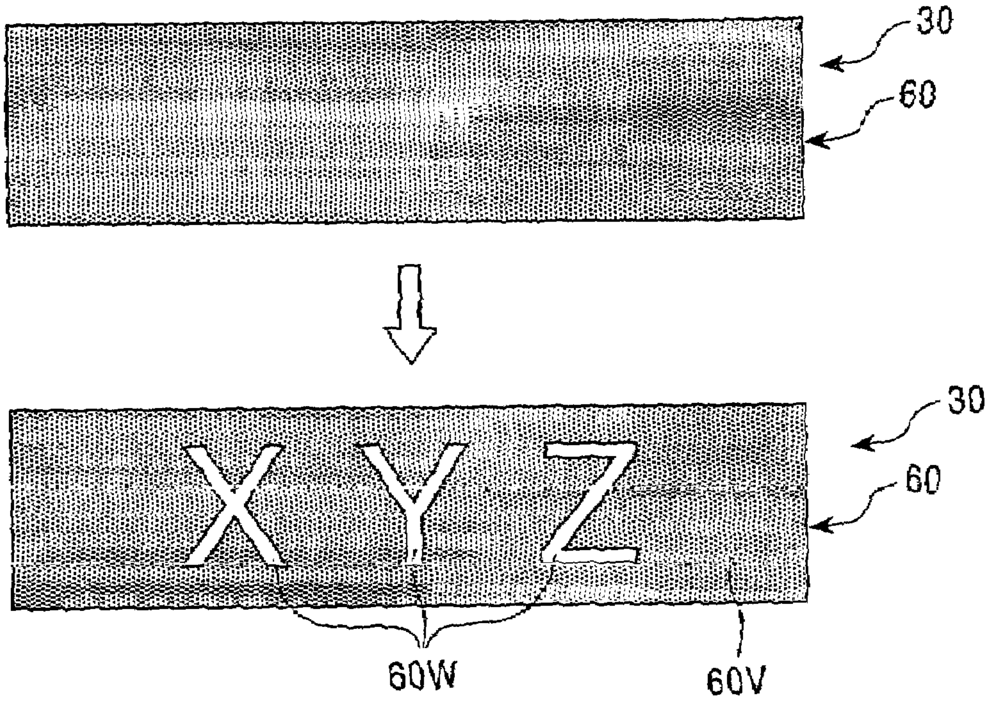
FIGS. 13A and 13B are views showing still another embodiment of the present invention.
Figure 13B:
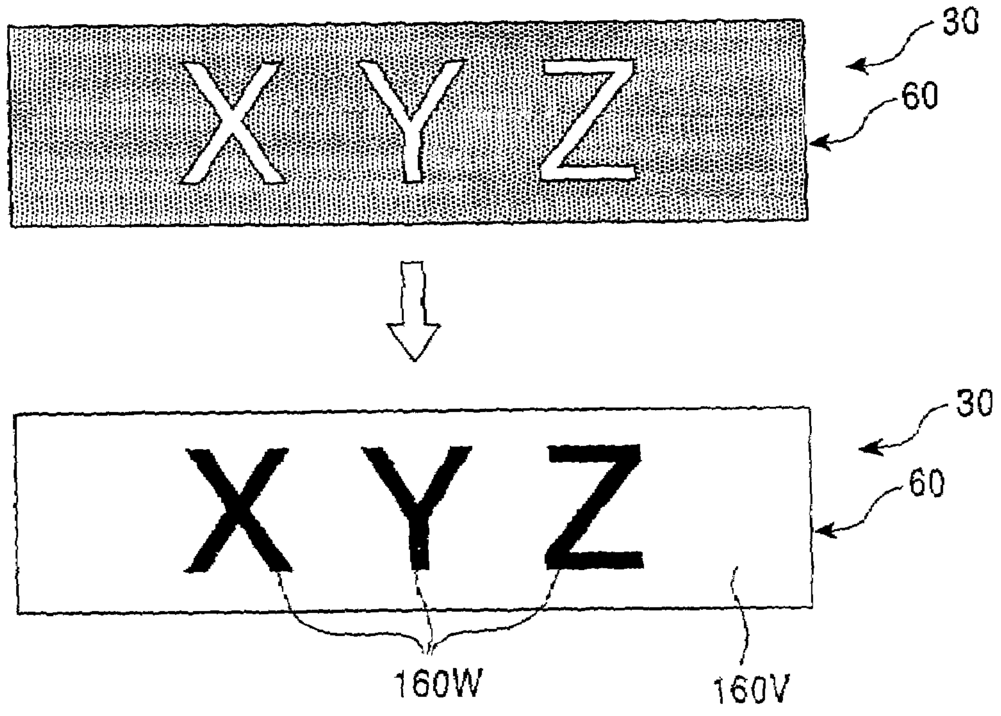

FIGS. 13A and 13B show still another embodiment of the present invention.

As shown in FIG. 13A, the reversible chromatic layer 60 of the switch 30 has an area 60V in which a paint having a certain temperature-dependent chromatic characteristic is coated, and has an area 60W in which a paint having a different temperature-dependent chromatic characteristic is coated. The area 60W has a pattern of letters "X", "Y" and "Z". Such constitution allows, as shown in FIG. 13A, the letters "X", "Y" and "Z" to emerge in the area 60W in response to the finger touch from the invisible state.

Or, as shown in FIG. 13B, it is also possible to coat a paint having a certain temperature-dependent chromatic characteristic in an area 160V and coat a paint having a different temperature-dependent characteristic in an area 160W, thereby to provide an visual effect such that a faint display of the letters "X", "Y" and "Z" becomes a more recognizable display.

With such patterning of the letters based on the masking technique as shown in FIGS. 13A and 13B, various characters can be emerged by the finger touch. The cases shown in FIGS. 12A, 12B, 13A and 13B are also applicable to the embodiment shown in FIGS. 1 and 11.

Using thus aligned switch 18 shown in FIG. 1 and providing the foregoing coating on the touch plane allow the color change by finger touch not only in a single press, but also in a sliding manner as shown in FIG. 1. Providing a proper delay period in the color change will allow the chromatic effect to be sustained in an area behind the finger passage.

It has been thought in the conventional art that providing a visual feedback display device to an input device such as a keyboard or touch panel was disadvantageous in terms of power consumption and complicated mechanism. Whereas the present invention is successful in the thinning, down sizing and the feedback without additional power consumption, so that down sizing and power saving of the electronic apparatus can be achieved while providing amusement through the visual effect.

Possible styles of the switch include those having aligned switches, and more specifically include a touch panel, serially-aligned planar press switch and matrix-aligned planar press switch.

According to the present invention, an extra-thin switch, feedback of which being not dependent only on the tactual sense, can be fabricated. Using such extra-thin switch results in reduction in the size and weight of the electronic apparatus.

Since the chromatic effect can be obtained without additional power consumption, the electronic apparatus can be used for a long period while suppressing the exhaustion of the battery.

In addition, the visual effects can provide the user with amusement in the input operation through such switch.

The present invention is by no means limited to the foregoing embodiments.

While FIG. 1 shows a portable music information reproducing apparatus as an exemplary electronic apparatus having the switch of the present invention, the electronic apparatus of the present invention is not limited to such apparatus and also covers a display or other type of apparatuses.

The switch and the electronic apparatus of the present invention allows down sizing and thinning of the electronic apparatus, and provides the user with amusement of visual effect in the feedback without additional power consumption.

Figure 14:
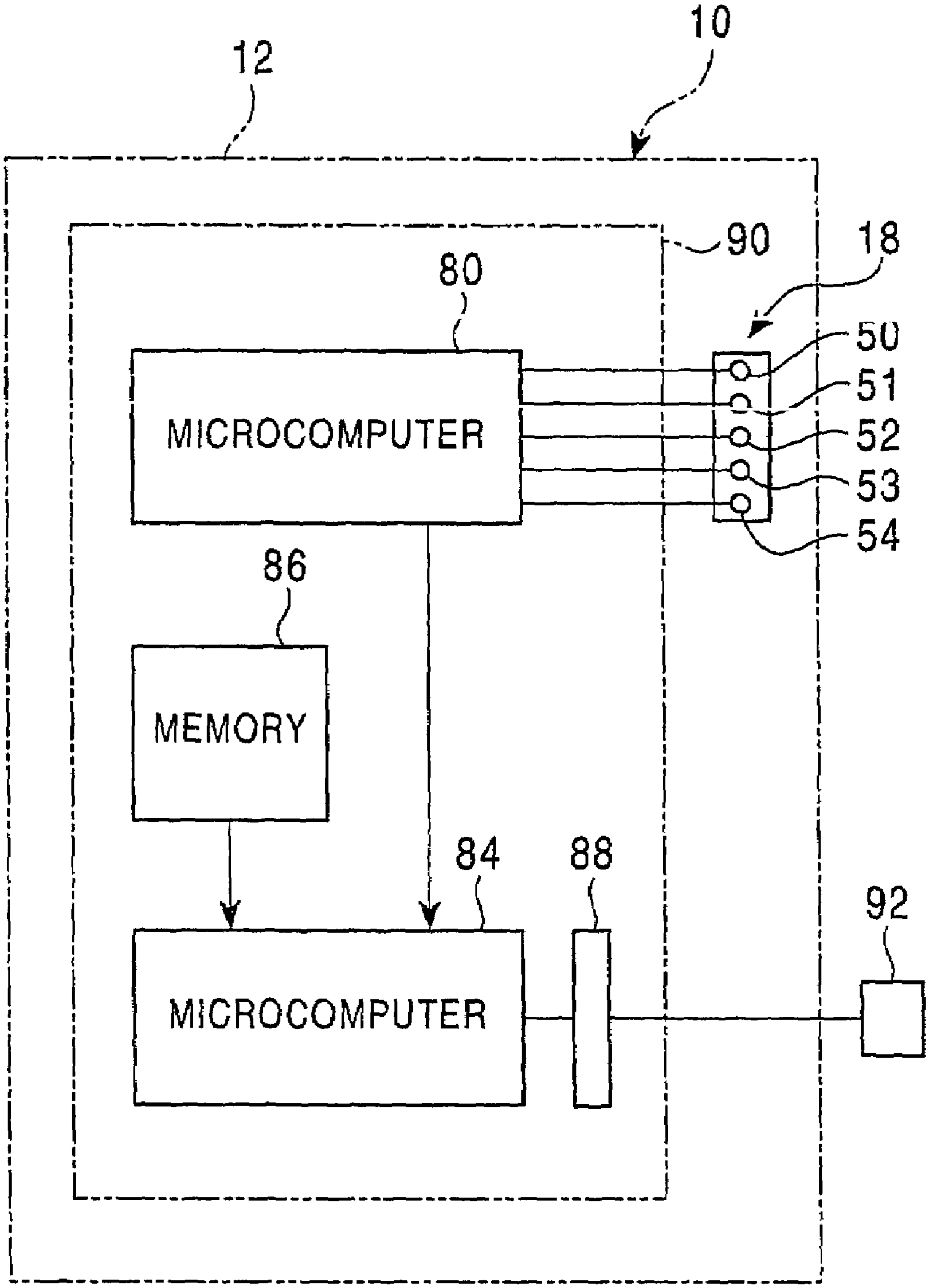
FIG. 14 is a block diagram showing an exemplary internal structure of the electronic apparatus shown in FIG. 1.

FIG. 14 shows an exemplary electrical connection between the switch 18 and the individual components of the electronic apparatus 10 previously shown in FIG. 1. In the housing 12, provided are a microcomputer 80 dedicated for key input, a microcomputer 84 for general control, a memory 86 for storing, for example, arbitrary music information, and a music information amplifying output portion 88.

The microcomputers 80 and 84, the memory 86 and the music information amplifying output portion 88 composes a circuit unit 90, and the circuit unit 90 is located in an inner space of the housing 12.

The microcomputer 80 is connected to the switch contact points 50 to 54 of the sheet-type switch portion 62 previously shown in FIG. 2.

The microcomputer 80 is also connected to the microcomputer 84 for general control. The memory 86 is connected to the microcomputer 84 for general control. The microcomputer 84 controls the microcomputer 80, memory 86 and music information amplifying output portion 88.

The microcomputer 84 is connected to the music information amplifying output portion 88. The music information amplifying output portion 88 amplifies music information received from the memory 86 via the microcomputer 84 and then outputs the information to the output portion 92 such as a headphone or earphone. Using the output portion 92 makes the music information audible to the user.

The information output from the output portion 92 may of course not only be the music information but also be other type of audio information.

A semiconductor memory, for example, and any other type of memory are applicable as the memory 86. The memory 86 may be fixed to the circuit unit 90, or may be composed so as to be detachable from the circuit unit 90. It is also possible to directly write music or other information through a communication network such as Internet.

Available semiconductor memories include DRAM (dynamic random access memory) and SRAM (static random access memory). Hard disk is a typical example of other type of memory.

Figure 15:
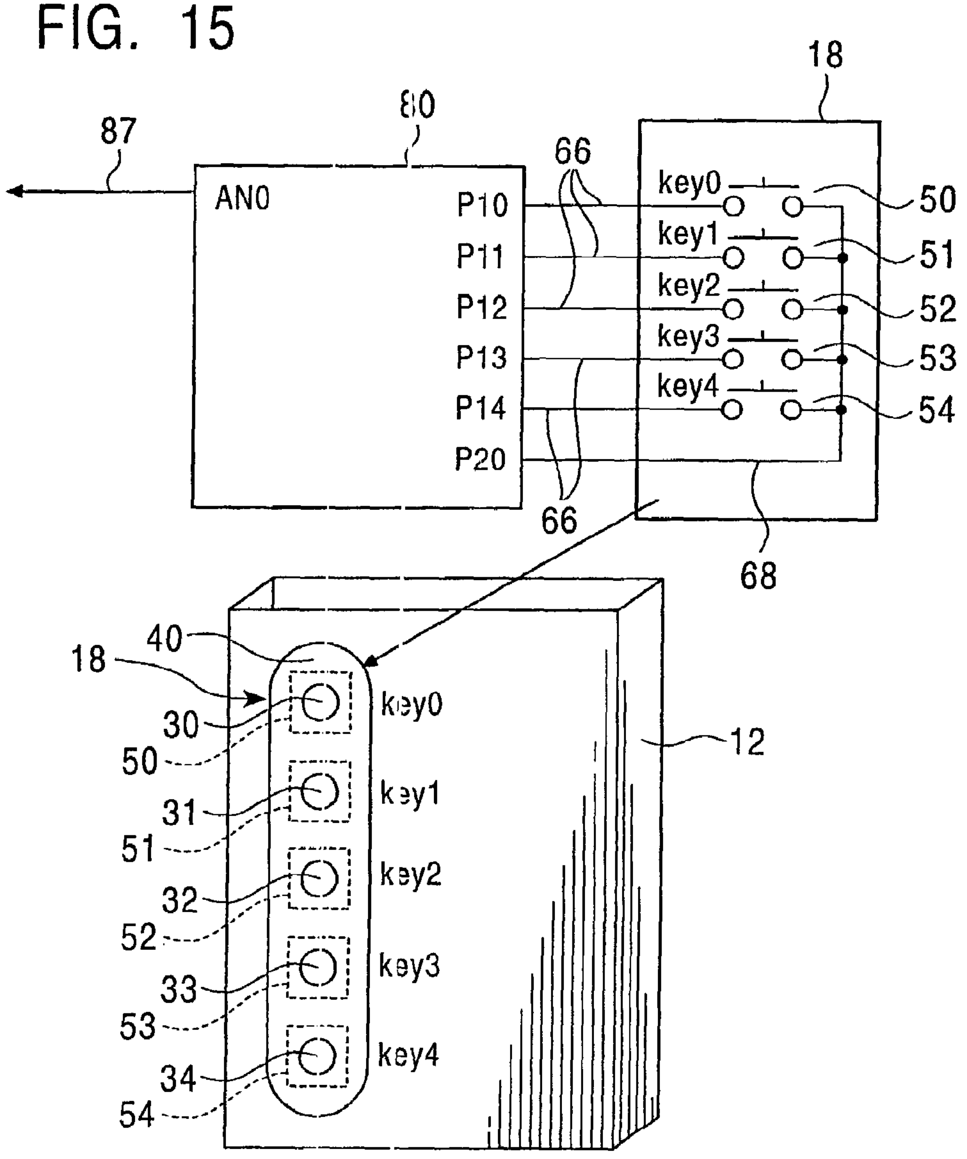
FIG. 15 is a diagram showing an exemplary connection of the input device, a microcomputer and so forth.

FIG. 15 shows an exemplary connection between the microcomputer 80 and switch contact points 50 to 54 previously shown in FIG. 14. In FIG. 15, the switch contact points 50 to 54 are denoted as key0 to key4.

The switch contact points 50 to 54 are individually connected via wirings 66 to ports P10 to P14 of the microcomputer 80 as shown in FIG. 15. Port P20 of the microcomputer 80 is connected to a common electrode 68 for the switch contact points 50 to 54.

It is also allowable to design an output portion 87 of the microcomputer 80 so as to output a voltage corresponding to an input key code decided by internal processing of a microcomputer 80. Examples of such key codes and the relevant output voltage ratio are listed in Table (A) in FIG. 15.

Input key code VOL+ in Table (A) in FIG. 15 enables raising of the sound level from the music information amplifying output portion 88 shown in FIG. 14, the corresponding output voltage ratio being 0.5. Input key code VOL− enables lowering of the sound level, the corresponding output voltage ratio being 0.57.

Input key code STOP stops replay of music information, the corresponding output voltage ratio being 0.59. Input key code PLAY/FF enables transfer of music information from the memory 86, shown in FIG. 14, to the output portion 92 and feed-forward of the music information, the corresponding output voltage ratio being 0.73. Input key code REW enables recovering the replay position of music information from the memory 86, shown in FIG. 14, the corresponding output voltage ratio being 0.9.

Now the output voltage ratio is defined as output voltage=output voltage ratio×Vcc where, Vcc is a reference voltage and is typically 5 V.

Figure 16:
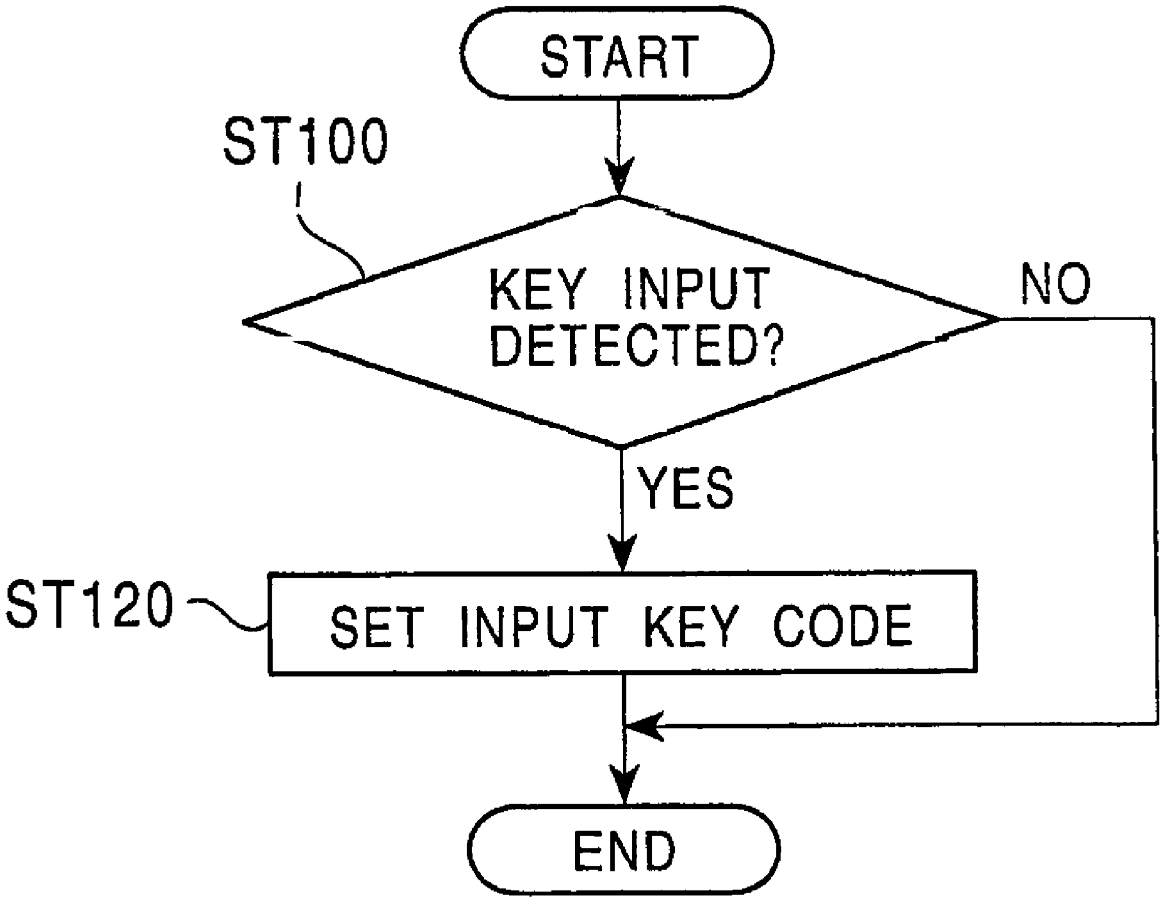
FIG. 16 is a flow chart showing an exemplary key input operation.

FIG. 16 shows an exemplary key input operation for the input device 18 previously shown in FIGS. 1 to 3. FIG. 17 shows an exemplary input key code decision table.

For example, if a key input is detected in step ST100 in FIG. 16, which is actually done by the switch contact points 50 to 54 in FIG. 2, an input key code listed in FIG. 17 is set in step ST120.

The exemplary input key code decision table of FIG. 17 shows key (switch contact point) initially turned ON in Column (A), current. ON key in Column (B) and applied input key code in Column (C).

The input key code decision table of FIG. 17 also has Rows (D), (E) and (F).

Rows (D) shows various key codes defined by combinations of the key initially turned ON in Column (A) and the current ON key in Column (B). For example, when the key initially turned ON is key0 and current ON key defined within a predetermined period is again key0, that is, when the same key was pressed twice within a predetermined period, the input key code will be VOL+ (raising sound level).

When the key initially turned ON is key1 and current ON key defined within a predetermined period is again key1, the input key code will be invalid. Similarly, key3 for the key initially turned ON and key3 for the current ON key defined within a predetermined period will also result in an invalid input key code.

Key2 for the key initially turned ON and key2 for the current ON key defined within a predetermined period will result in an input key code of STOP (cessation of replay of music information); and key4 for the key initially turned ON and key4 for the current ON key defined within a predetermined period will result in an input key code of VOL− (lowering sound level).

Rows (E) of FIG. 17 correspond to the cases in which an input key code PLAY/FF is generated when the key initially turned ON and the current ON key defined within a predetermined period are different with each other. For example, when the key initially turned ON is key0 and the current ON key defined within a predetermined period is key0, the input key code will be PLAY (replay operation of music information)/FF (feed-forward to replay position of music information).

While Rows (E) correspond to the cases in which the key initially turned ON is smaller than the current ON key, Rows (F) on the contrary corresponds to the cases in which the key initially turned ON is larger than the current ON key. In these cases, the input key code will be REW (recovering replay position of music information). For example, when the key initially turned ON is key4 and the current ON key defined within a predetermined period is key3, the input key code will be REW.

FIG. 18 shows an exemplary input key code decision sequence.

In the key scan shown in Column (A) of FIG. 18, the microcomputer 80 previously shown in FIG. 15 scans the ports P10 to P14 to detect ON state thereof, and sets those in the ON state as the initially ON keys.

Of course, chattering elimination, noise isolation and other software-base processing internally proceed at that time so as to avoid false recognition of pressing the key despite no human intention of pressing the key, or to avoid false judgment of pressing the key interfered by external electromagnetic noise.

Thereafter, the switch will be pressed again according to the modes shown in Columns (B) to (D) of FIG. 18, that is, any key will be pressed within a predetermined period.

When the same key is pressed within a predetermined period as described in Column (B) of FIG. 18, the input key codes shown in Rows (D) of FIG. 17 will come into effect.

When the adjacent key is turned into ON, the input key code PLAY/FF or REW will come into effect according to the combination listed in Rows (E) and (F) of FIG. 17.

Column (D) of FIG. 18 indicates other key operation, in which a current ON key is set as an initially ON key while ignoring the function of a key initially turned ON. One typical case relates to that the current ON key shown in Column (A) of FIG. 17 is pressed after an elapse of a predetermined period after pressing the key initially turned ON.

Next, an exemplary operation of the input device 18 previously shown in FIGS. 1 to 3 will be detailed.

As shown in FIG. 1, the user serially presses the switch contact points 50 to 54 with the finger F by scanning along the longitudinal direction X1 of the slit portion 40 or the counter direction X2; or presses only any one switch contact point.

In this case, the slit portion 40 shown in FIGS. 2 and 3 can correctly guide the pad of the finger F towards the switch contact points 50 to 54, which allows the user's finger surely touch the contact point 50 to 54. Since the slit portion 40 can support a part of the finger pad, the finger pad will never exert an unnecessary force on the sheet-type switch portion 62, which will successfully prevent properties of the sheet-type switch portion 62 and the switch contact points 50 to 54 from being degraded.

For example, when the user presses the switch contact point 50 for operation shown in FIG. 1 a plural times, for example, twice, within a predetermined period, the microcomputer 80 shown in FIG. 15 will send a control signal representing the input key code VOL+ to another microcomputer 84 shown in FIG. 14 according to the description in Rows (D) of FIG. 17. The microcomputer 84 will send a control signal to the music information amplifying output portion 88, which will raise the sound level of the music information output from the output portion 92.

When the user presses, for example, the switch contact point 50 (key0) for operation and then presses the switch contact point 51 (key1) for operation within a predetermined period, the input key code of PLAY/FF will come into effect as shown in Rows (E) of FIG. 17, and a control signal for PLAY/FF will be sent from the microcomputer 80 to the microcomputer 84 shown in FIG. 14. Thus the music information stored in the memory 86 will be replayed from the output portion 92 with the aid of the microcomputer 84, or replay position thereof will be fed forward. The feed forward operation allows search for the beginning of the next title.

When the user presses, for example, the switch contact point 54 (key4) for operation and the switch contact point 53 (key3) for operation within a predetermined period, the input key code of REW will come into effect by the microcomputer 80 as shown in Rows (F) of FIG. 17, and a control signal for REW will be sent from the microcomputer 80 to the microcomputer 84 shown in FIG. 14. Thus the microcomputer 84 will recover a certain replay position of the music information stored in the memory 86.

As described in the above, when the user serially touches by the finger an arbitrary number of key tops from the switch contact points 50 to 54, complete touch will be effected simply by sliding the finger along the longitudinal direction X1 of the slit portion 40 or along the counter direction X2. Moreover, only a limited number of switch contact points 50 to 54 for operation can afford selection of various functions as listed in FIG. 17 by a simple operation with the user's finger. An input key code decision table available in such use can be displayed, for example, on the rear plane of the housing 12 shown in FIG. 1.

The present invention is by no means limited to the foregoing embodiments and permits various modifications.

The microcomputers 80 and 84 shown in FIG. 14 can be integrated into a single microcomputer.

The input device 18 shown in FIG. 1 is provided for an electronic apparatus, and more specifically for a portable music reproducing device. A music reproducing device including such an input device may be of hand-held type, arm-held type, pendant type or of other types.

The input device of the present invention can be applicable not only to such an electronic apparatus for replaying music or music information, but also to a recording and reproducing apparatus for music information. The input device of the present invention still can be applicable not only to recording and reproducing of music information, but also to recording and reproducing apparatus of image and audio information, or to reproducing apparatus of image and audio information.

The input device of the present invention can still further be applicable to electronic apparatus of other types or in other fields besides the applications described above. For example, applying the input device to a touch pad intended for character input will allow the user to proceed current input operation while confirming the locus of the input operation finished immediately before or a few seconds before. Thus a character of much strokes such as some kinds of Chinese characters can be input while confirming a relative positioning of a radical, and input error will be avoidable.

According to the embodiment of the present invention, conventional problems can be overcome by employing the feedback based on the visual sense in place of that based on the tactual sense.

A display using the feedback based on such visual effect is composed of a thin plate or thin film provided on the switch, which exhibiting the color change in response to the user's operation and more specifically to the motion of the switch. Such color change automatically recovers the initial state immediately after or within a proper delay period after the completion of the input operation, so that sufficient opportunities for confirming the input operation and enjoying the visual effects are given to the user.

By providing such chromatic mechanism to an input device such as a keyboard, touch switch or touch pad so as to be added to the top surface thereof or integrated with the input device, the color change upon the input operation will be obtained.

Employing a highly transparent material for the input device, in addition to such chromatic mechanism, allows the mechanism to be placed on the display device, which results in functional integration of the input and display devices and down sizing of the electronic apparatus.

The intentional introduction of the local difference in the chromatic effect to an area exhibiting the chromatic function can sufficiently provide the user with amusement in the operation.

If such chromatic mechanism is made detachable so as to allow the user to exchange it to his or her own taste, the user can also show the individuality.

What is claimed is:

1. An electronic apparatus having an input device, the input device comprising:

a sheet-type switch portion having a first sheet, a second sheet, a first electrode, and a second electrode, said first and second electrodes being between said first sheet and said second sheet, said first electrode being structurally adapted to come into electrical contact with said second electrode; and a reversible chromatic layer having at least two coatings, each of said at least two coatings being structurally adapted to exhibit thermochromism, said first sheet being between said reversible chromatic layer and said first electrode.

2. The electronic apparatus as claimed in claim 1, wherein said sheet-type switch portion includes a spacer between said first sheet and said second sheet, said spacer being adjacent said first and second electrodes.

3. The electronic apparatus as claimed in claim 2, wherein said spacer is formed from an insulating material.

4. The electronic apparatus as claimed in claim 2, wherein a void is between said spacer and another spacer, said first and second electrodes being disposed within said void.

5. The electronic apparatus as claimed in claim 1, wherein a first coating of said at least two coatings has a temperature-dependent chromatic characteristic different than a second coating of said at least two coatings.

6. The electronic apparatus as claimed in claim 5, wherein said first coating is laterally adjacent to said second coating.

7. The electronic apparatus as claimed in claim 5, wherein said first coating is in contact with said second coating.

8. The electronic apparatus as claimed in claim 5, wherein said second coating is on said first coating, a portion of said second coating being removed to expose said first coating.

9. The electronic apparatus as claimed in claim 1, further comprising:

a heat-insulating layer, said sheet-type switch portion being between said heat-insulating layer and said reversible chromatic layer.

10. The electronic apparatus as claimed in claim 9, wherein said heat-insulating layer is between said sheet-type switch portion and a circuit board, said heat-insulating layer being adapted to prevent heat generated by electronic parts on said circuit board from conducting toward said reversible chromatic layer.

11. The electronic apparatus as claimed in claim 1, wherein said reversible chromatic layer is located on a front surface of said sheet-type switch portion and exposed outward within a window provided to a housing of said electronic apparatus.

12. An electronic apparatus as claimed in claim 1, wherein an input operation is effected by direct contact with said reversible chromatic layer.

13. An electronic apparatus as claimed in claim 1, wherein said first sheet is structurally adapted to be plastically deformed.

14. An electronic apparatus as claimed in claim 1, wherein an input operation is effected by direct contact with said second sheet.

15. An electronic apparatus as claimed in claim 1, wherein said second sheet is structurally adapted to be plastically deformed.

* * * * *